US006226575B1

(12) United States Patent
Lu et al.

(10) Patent No.: US 6,226,575 B1
(45) Date of Patent: May 1, 2001

(54) VEHICLE DETECTOR WITH POWER FAILURE INFORMATION SAVING

(75) Inventors: Jason Zhenyu Lu, Sparks; Christopher A. Johnson, Stagecoach; John W. Hudrlik, Reno, all of NV (US)

(73) Assignee: Reno A & E, Reno, NV (US)

( * ) Notice: Subject to any disclaimer, the term of this patent is extended or adjusted under 35 U.S.C. 154(b) by 0 days.

(21) Appl. No.: 09/571,082

(22) Filed: May 15, 2000

(51) Int. Cl.[7] ........................ G06F 7/00

(52) U.S. Cl. ........................ 701/29; 701/34; 701/35; 340/428; 340/438; 340/455; 73/116

(58) Field of Search ........................ 701/29, 34, 35; 73/116; 340/428, 438, 455

(56) References Cited

U.S. PATENT DOCUMENTS 5,809,437 * 9/1998 Breed ........................ 701/29

* cited by examiner

*Primary Examiner*—William A. Cuchlinski, Jr.
*Assistant Examiner*—Yonel Beaulieu

(57) ABSTRACT

A method and apparatus for storing reference information in a non-volatile memory unit when a power loss to a vehicle detector is imminent. A power monitor circuit senses an impending power loss. In response, the vehicle detector transfers reference information, including a reference count and the number of loop cycles over which the reference count was accumulated, as well as optional detector status information, from the vehicle detector volatile memory (typically RAM) to the non-volatile memory unit. When power is resumed, the information stored in the non-volatile memory unit is restored to the vehicle detector. The restored information prevents improper and potentially dangerous vehicle detector operation caused by the loss of reference information during unpredictable power losses. The transfer operation is not performed if the power loss is due to a mechanical disconnection of power. By limiting the information transfer operation to only an impending power loss condition, the use of non-volatile memory to store the information is made practically feasible.

20 Claims, 2 Drawing Sheets

VEHICLE DETECTOR WITH POWER FAILURE INFORMATION SAVING

BACKGROUND OF THE INVENTION

This invention relates to vehicle detectors used to detect the presence or absence of a motor vehicle in an inductive loop embedded in a roadbed. More particularly, this invention relates to a vehicle detector with a reference information saving feature upon power failure.

Vehicle detectors have been used for a substantial period of time to generate information specifying the presence or absence of a vehicle at a particular location. Such detectors have been used at vehicular traffic intersections, for example, to supply information used to control the operation of the traffic signal heads; have been used to supply control information used in conjunction with automatic entrance and exit gates in parking lots, garages and buildings; have been used in railway installations for railway car detection and control; and have been used in security barrier installations to prevent the sudden erection of a security barrier from underneath an overlying vehicle. A widely used type of vehicle detector employs the principle of period shift measurement in order to determine the presence or absence of a vehicle in or adjacent the inductive loop mounted on or in a roadbed. In such systems, a first oscillator, which typically operates in the range from about 10 to about 120 kHz is used to produce a periodic signal in a vehicle detector loop. A second oscillator operating at a much higher frequency is commonly used to generate a sample count signal over a selectable number of loop cycles. The relatively high frequency count signal is typically used to increment a counter, which stores a number corresponding to the sample count at the end of the selected number of loop cycles. This sample count is compared with a reference count stored in another counter and representative of a previous count over the same number of loop cycles in order to determine whether a vehicle has entered or departed the region of the loop in the time period between the previous sample count and the present sample count. The number of loop cycles selected is related to the sensitivity of the vehicle detector, and this number is typically set manually by a field service technician when installing or re-initializing the detector. In some detectors, this selection process is aided by an automatic default setting built into the detector system.

The initial reference value is obtained from one or more initial sample counts and stored in a reference counter. Thereafter, successive sample counts are obtained on a periodic basis, and compared with the reference count. If the two values are essentially equal, the condition of the loop remains unchanged, i.e., a vehicle has not entered or departed the loop. However, if the two numbers differ by at least a threshold amount in a first direction (termed the Call direction), the condition of the loop has changed and may signify that a vehicle has entered the loop. More specifically, in a system in which the sample count has decreased and the sample count has a numerical value less than the reference count by at least a threshold magnitude, this change signifies that the period of the loop signal has decreased (since fewer counts were accumulated during the fixed number of loop cycles), which in turn indicates that the frequency of the loop signal has increased, usually due to the presence of a vehicle in or near the loop. When these conditions exist, the vehicle detector generates a signal termed a Call Signal indicating the presence of a vehicle in the loop.

Correspondingly, if the difference between a sample count and the reference count is greater than a second threshold amount, this condition indicates that a vehicle which was formerly located in or near the loop has left the vicinity. When this condition occurs, a previously generated Call Signal is dropped.

In order to function properly, the initial reference value must be obtained while the loop is not under the influence of a vehicle. Past detectors obtain the initial reference count value by seeking the largest count obtained during the sample count process and using that number for the reference count value. Since the largest count value occurs when no vehicle is present over the loop, the detector cannot operate properly until the detector experiences the first vacant loop condition. The Call signals generated by a vehicle detector are used in a number of ways. Firstly, the Call signals are presented to an output terminal of the vehicle detector and forwarded to various types of traffic signal supervisory equipment for use in a variety of ways, depending on the system application. In addition, the Call signals are used locally to drive a visual indicator, typically a discrete light emitting diode (LED) or a multiple LED display or a liquid crystal display (LCD) to indicate the Call status of the vehicle detector, i.e. whether or not the vehicle detector is currently generating a Call signal.

Vehicle detectors with the Call signal generating capability described above are used in a wide variety of applications, including vehicle counting along a roadway or through a parking entrance or exit, vehicle speed between preselected points along a roadway, vehicle presence at an intersection controlled by a traffic control light system, in a parking installation entrance gate, in a parking stall, in railroad yards and numerous other applications.

Most present day vehicle detectors are designed and manufactured using a microprocessor-based architecture. This type of system architecture uses volatile random access memory (RAM) to store reference samples, status information and other information (such as system sensitivity) needed for the proper identification of vehicle arrival or departure from the location monitored by the vehicle detector. Such vehicle detectors are sensitive and vulnerable to power outages, particularly due to the severe environment in which they are typically installed. When power to a detector is interrupted, the reference information stored in the volatile system RAM is lost. When power is subsequently restored, the vehicle detector must resume operation without the lost reference information. This can lead to improper and dangerous operating conditions, as the following examples will demonstrate.

In parking lot entrance installations, a vehicle detector is commonly used to provide advisory signals used in the operation of an automatic gate. When a vehicle enters a loop in front of the gate, the vehicle detector normally generates a Call signal, which is used to open the gate so that the vehicle can pass through the gated entrance and proceed to a parking stall. Once the vehicle has left the loop, the vehicle detector drops the Call signal and the gate is operated to the closed position. If a power outage occurs when the vehicle is over the loop and the reference information is lost from system RAM, the current reference value is lost. If the vehicle is still over the loop when power is resumed, a new reference value is obtained which prevents the detection of the continued presence of the vehicle over the loop. As a result, the automatic gate is closed while the vehicle is in the gate area, usually damaging the vehicle.

In rail yard applications, vehicle detectors are commonly used to help control the operation of track switches. More particularly, in such installations the need frequently arises to move rail cars from one track to another for traffic management purposes. In order to move a rail car from one track to another, the car is propelled along the present track toward a track switch. Before the railcar reaches the track switch, the switch is operated to divert the approaching car from the present track to a desired different track. The vehicle detector is usually connected to a loop positioned to monitor the track switch region in order to detect the presence of a rail car over the switch region. If a rail car is present over the switch region, the Call signal generated by the vehicle detector is used to prevent operation of the track switch in order to preclude derailing of the rail car. If a power outage occurs while a rail car is present over the switch region and the reference information is lost from system RAM, the current reference value is lost. If the rail car is still over the loop when power is resumed, a new reference value is obtained which prevents the detection of the continued presence of the rail car over the loop in the track switch region. As a result, if the track switch is operated the rail car can be derailed.

In a left turn lane at a controlled vehicle intersection, a vehicle detector is typically used to monitor the presence of a vehicle waiting for the control green signal (commonly a left-pointing arrow) so that the vehicle can proceed into the intersection and make a left turn. If no vehicle is detected at the time the left turn signal is normally turned green by the intersection controller, this phase of the traffic control cycle is typically skipped, so that the left turn signal remains red. If a vehicle is detected, the left turn phase is entered and the vehicle is given a green signal thereby permitting the vehicle to proceed into the intersection a make a left turn. If a power outage occurs while a vehicle is present over the left-turn loop and the reference information is lost from system RAM, the current reference value is lost. If the vehicle is still over the left-turn loop when power is resumed, a new reference value is obtained which prevents the detection of the continued presence of the vehicle waiting for the left turn signal to turn green. Since the vehicle waiting for the green left turn arrow is no longer detected following an interruption of power to the vehicle detector and traffic signal controller, the traffic signal controller provides a safe condition for the intersection upon the return of power. The traffic signal controller accomplishes a safe start up condition, following the return of power, by providing a minimum amount of green time for each traffic lane. This minimum amount of green time ensures that traffic in each lane is allowed to move so that each detector experiences, as a minimum, a momentary vacant condition; and therefore is able to obtain a valid reference count value. Without the traffic signal controller providing green time for each traffic lane following the application of power, the detectors would not be able to obtain a valid reference value; thus creating a very dangerous condition, which could result in an accident. In security barrier applications, vehicle detectors are used to condition the operation of retractable barrier posts or solid structures designed to prevent entry of vehicles into a secure area. Such barrier devices are typically designed to be in a normally erect position above the surface of the ground or pavement. Normally, an approaching vehicle encounters the erect barrier and cannot enter the area unless authorized to do so by a human operator (e.g. a security guard posted at the entrance to the area) or an automatic authorization system (such as a card-actuated barrier operating system). A vehicle detector system is typically installed in a position to generate a call signal whenever a vehicle is positioned over the barrier when in the retracted state in order to prevent the erection of the barrier from beneath the vehicle and consequent damage. If a power outage occurs when a vehicle is over a retracted barrier and the reference information is lost from system RAM, the current reference is lost. If the vehicle is still over the loop (and thus the barrier) when power is resumed, a new reference value is obtained which prevents the detection of the continued presence of the vehicle over the loop. As a result, the barrier is suddenly erected and the vehicle is usually severely damaged.

As will now be apparent, the need exists for some mechanism to prevent the loss of reference information in a vehicle detector when a power outage occurs. In a microprocessor-based vehicle detector, a workable solution might appear to be to add non-volatile memory and store the reference information in this memory each time the values are updated. However, this approach is not practically feasible. Known non-volatile memory devices suffer from the limitation of possessing only a finite number of read/write cycles. After this limit has been reached, a typical non-volatile memory device cannot be relied upon to reliably store and retrieve information. The limit is typically about one million erase/write cycles, after which the device manufacturer will no longer guarantee reliability. In a typical microprocessor-based vehicle detector, the number of samples taken per second can be as high as one thousand, depending on the sensitivity setting of the detector (the sensitivity setting establishes the length of the sample period, usually defined by the number of loop cycles during which the high speed counter is permitted to accumulate counts). Consequently, the reliability limit, and thus the useful lifetime, of a non-volatile memory device in such a vehicle detector can be reached after only one thousand seconds of operation, or slightly less than seventeen minutes, if the detector is being operated at the lowest sensitivity. Even at higher sensitivities, the useful lifetime of a non-volatile memory device in a vehicle detector can be exceeded in less than forty hours of operation. Since vehicle detectors are expected to operate reliably in situ for years, the simple addition of non-volatile storage to permanently store reference information is not a practical solution to the problem.

SUMMARY OF THE INVENTION

The invention comprises a vehicle detector system which solves the problem of lost reference information upon power outage by providing non-volatile storage to save the reference information only when a power outage is imminent.

From an apparatus standpoint the invention comprises an improvement in a vehicle detector having circuitry powered by a source of electrical power for sensing changes in an associated inductive loop related to the presence of a vehicle in the vicinity of the loop and for generating a Call signal in response to such changes; the improvement comprising a non-volatile memory device for receiving and storing reference information from the vehicle detector, a power monitor circuit for detecting an impending loss of power to the vehicle detector, and means responsive to the power monitor circuit for storing the reference information in the non-volatile memory device upon detection of an impending loss of power.

The reference information includes a loop inductance reference count accumulated over a sample period and a sample period value, the sample period value preferably comprising the number of loop cycles over which the reference count was accumulated. The reference information optionally includes status information relating to the detector prior to the loss of power, such as the Call status (i.e. an indication whether the vehicle detector is generating a Call signal when the impending loss of power is detected by the power monitor circuit), any loop failures, and the status of any reference tracking routines. The reference information stored in the non-volatile memory device preferably includes status information generated by the vehicle detector during the impending power down routine specifying whether valid data is being stored in the non-volatile memory device.

For multi-channel vehicle detectors designed for use with more than one loop, the reference information includes a plurality of channel identifiers each associated to a different one of the loop channels for correlating the reference information transferred to the non-volatile memory device with the channel associated thereto.

The invention further includes means for enabling transfer of the reference information back to the vehicle detector when power is resumed after a loss, so that the vehicle detector can resume operation with reference to the operating history prior to power loss.

Because the reference information is not operationally significant if the power loss resulted from the vehicle detector being unplugged from the power source, the invention preferably includes means for sensing an impending loss of power due to a mechanical interruption of power to the vehicle detector, and means for preventing operation of the means for enabling transfer in response to the operation of the sensing means. The sensing means preferably includes means for determining the absence of a connection between the loop and the vehicle detector.

From a process standpoint, the invention comprises a method of saving reference information in a vehicle detector volatile memory prior to an impending power loss, the method comprising the steps of sensing an impending loss of power to the vehicle detector; and storing the reference information in a non-volatile memory device before the vehicle detector becomes inoperative due to a loss of power. The reference information preferably includes a loop inductance reference count accumulated over a sample period and a sample period value, while the sample period value preferably comprises the number of loop cycles over which the reference was accumulated. The reference information further preferably includes status information relating to the detector prior to loss of power, such as an indication whether the vehicle detector is generating a Call signal when the impending loss of power is detected by the power monitor circuit. The reference information further preferably includes status information specifying whether valid data is presently being stored in the non-volatile memory device when the power down routine is being performed.

When the process is implemented with a multi-channel vehicle detector capable of operating more than one loop, the reference information includes a plurality of channel identifiers each associated to a different one of the loop channels for correlating the reference information stored in the non-volatile memory device with the channel associated thereto.

The method further includes the step of enabling transfer of the reference information back to the vehicle detector when power is resumed after a loss.

Because the reference information is not operationally significant if the power loss resulted from the vehicle detector being unplugged from the power source, the method further includes the steps of sensing an impending loss of power due to a mechanical interruption of power to the vehicle detector, and preventing performance of the step of enabling transfer when an impending loss of power due to a mechanical interruption is sensed. The step of sensing preferably includes the step of determining the absence of a connection between the loop and the vehicle detector.

The invention enables the storage of valuable and necessary vehicle detector reference information in a non-volatile memory unit prior to the loss of that information due to a power outage, without requiring an excessive number of erase/write operations which have heretofore precluded the use of cost effective non-volatile storage of such information.

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
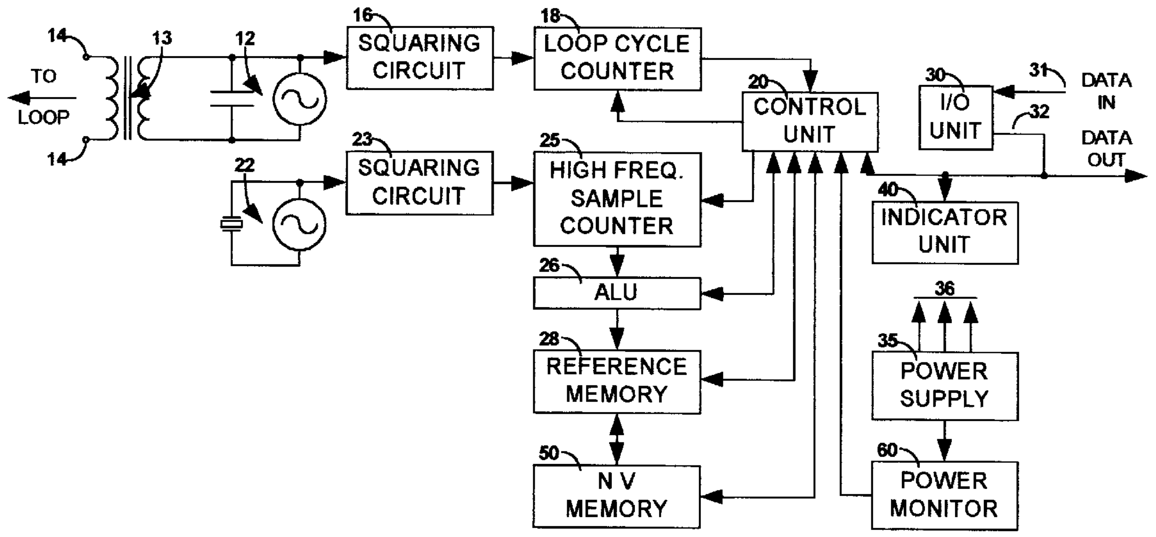
FIG. 1 is a block diagram of a vehicle detector incorporating the invention.

Turning now to the drawings, FIG. 1 is a block diagram of a vehicle detector incorporating the invention. As seen in this figure, an oscillator 12 operable over a frequency range of about 10 to about 120 kHz is coupled via a transformer 13 to a pair of output terminals 14. Output terminals 14 are adapted for connection to an inductive loop usually mounted within the roadbed or rail bed in a position such that vehicles to be sensed will pass over the loop. Such loops are well-known and are normally found installed at controlled locations in the highway system, such as at intersections having signal heads controlled by a local intersection unit, parking lots with controlled access, rail yard track switch locations, security barrier installations and the like.

The oscillator circuit 12 is coupled via a squaring circuit 16 to a loop cycle counter 18. Loop cycle counter 18 typically comprises a multi-stage binary counter having a control input for receiving appropriate control signals from a control unit 20 and a status output terminal for providing appropriate status signals to the control unit 20, in the manner described below.

A second oscillator circuit 22, which typically generates a precise, crystal controlled, relatively high frequency clock signal (e.g., a 6 mHz clock signal) is coupled via a second squaring circuit 23 to a second binary counter 25. Counter 25 is typically a multi-stage counter having a control input for receiving control signals from control unit 20 and a count state output for generating signals representative of the count state of counter 25 at any given time. The count state of counter 25 is coupled as one input to an arithmetic logic unit 26. The other input to arithmetic logic unit 26 is one or more reference values stored in a reference memory 28. Reference memory 28 is controlled by appropriate signals from control unit 20 in the manner described below.

An input/output unit 30 is coupled between the control unit 20 and externally associated circuitry. I/O unit 30 accepts appropriate control signals via an upper input path 31 to specify the control parameters for the vehicle detector unit of FIG. 1, such as mode, sensitivity, and any special features desired. I/O unit 30 furnishes data output signals via lower path 32, the data output signals typically comprising Call signals indicating the arrival or departure of a vehicle from the vicinity of the associated loop. In the preferred embodiment, the implementation of the system of FIG. 1 has been done using a type 17C44 processor available from Microchip Corp. of Chandler, Ariz.

Initially, control unit 20 supplies control signals to loop cycle counter 18 which define the length of a sample period for the high frequency counting circuit comprising elements 22, 23 and 25. For example, if control unit 20 specifies a sample period of six loop cycles, loop cycle counter 18 is set to a value of six and, when the sample period is to commence, control unit 20 permits loop cycle counter 18 to begin counting down from the value of six in response to the leading edge of each loop cycle signal furnished via squaring circuit 16 from loop oscillator circuit 12. Contemporaneously with the beginning of the countdown of the loop cycle counter 18, control unit 20 enables high frequency counter 25 to accumulate counts in response to the high frequency signals received from high frequency oscillator circuit 22 via second squaring circuit 23. At the end of the sample period (i.e., when the loop cycle counter has been counted down to zero), control unit 20 generates a disable signal for the high frequency counter 25 to freeze the value accumulated therein during the sample period. Thereafter, this sample count value is transferred to the ALU 26 and compared with the value stored in reference memory 28, all under control of control unit 20. After the comparison has been made, the sample process is repeated.

The reference value in reference memory 28 is a value representative of the inductance of the loop oscillator circuit comprising elements 12–14 (and the associated loop) at some point in time. The reference is updated at the end of certain periods in response to certain comparisons involving the reference stored in memory 28 and successively obtained samples from counter 25. Whenever the difference between a given sample from counter 25 and the reference from memory 28 exceeds a first threshold value in the Call direction, the control unit 20 senses this condition and causes the generation of an output signal—termed a Call signal—on conductor 32 indicating the arrival of a vehicle within the loop vicinity. Similarly, when the difference between a given sample and the previous reference exceeds a second threshold in the No Call direction the control unit 20 senses this condition and causes the Call output signal on conductor 32 to be dropped. In the preferred embodiment, the Call direction is negative and the Call direction threshold value is −8 counts; while the No Call threshold value is −5 counts.

Power is supplied to the system elements depicted in FIG. 1 from a dedicated power supply 35 via appropriate power conductors suggested by arrows 36. Power supply 35 typically provides DC voltage to the electronic circuit components comprising the vehicle detector, and is usually powered by either AC or DC electrical power available at the installation site of the vehicle detector.

Call signal conductor 32 is coupled to an indicator unit 40 having a visible indicator and, optionally, an audible indicator. Whenever the Call signal is asserted, both the visible indicator and the optional audible indicator of indicator unit 40 are activated. Whenever the Call signal is de-asserted, both the visible indicator and the optional audible indicator are de-activated.

Reference memory 28 is coupled to a non-volatile memory device 50, such as a type 24C02C serial EEPROM device available from Microchip Corp. of Chandler, Ariz. Memory device 50 is used in the manner described below to store current reference information whenever a power outage is imminent, and to furnish such stored information to the vehicle detector system when power is resumed after an outage. Memory device 50 is coupled to and controlled by control unit 20.

A power monitor circuit 60 monitors the value of the voltage supplied by power supply 35. Whenever the value of the supply voltage drops below a fixed threshold, power monitor circuit 60 generates a control signal, which is coupled to control unit 20, signifying an imminent power outage. When control unit 20 receives this control signal, a power down impending routine is initiated by control unit 20 as described more fully below, which results in the transfer of current reference information from reference memory 28 to non-volatile memory device 50. The value of the fixed threshold is chosen to be sufficiently high to afford sufficient time for control unit 20 to complete the power down impending routine prior to a drop in value of the supply voltage below the level required to sustain control unit 20, reference memory 28, and non-volatile memory device 50. When power is restored after a power outage, the reference information stored in non-volatile memory device 50 is initially transferred to reference memory 28 by control unit 20 prior to commencing normal operation.

Figure 2:
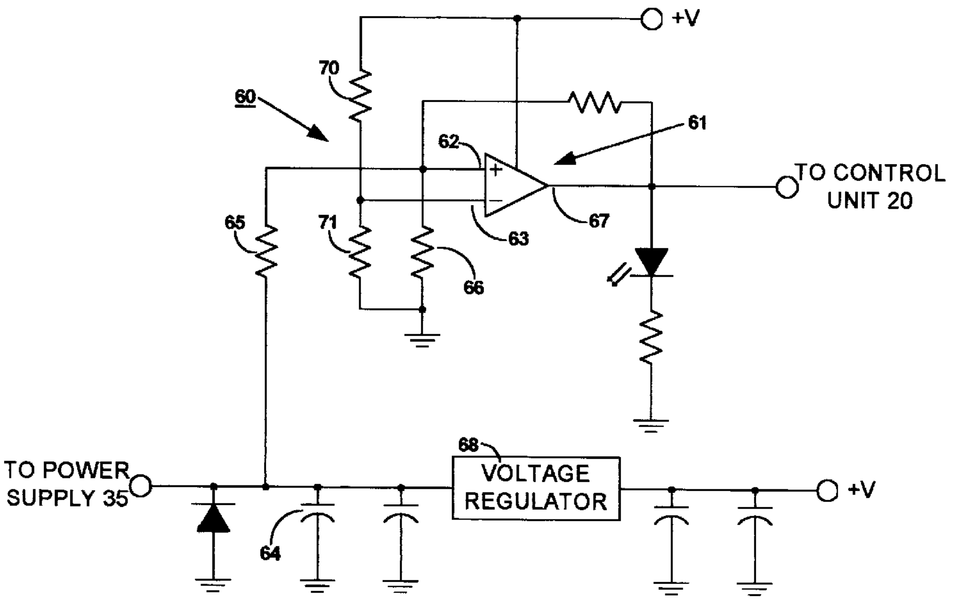
FIG. 2 is a circuit diagram of the preferred embodiment of the power monitor according to the invention.

With reference to FIG. 2, power monitor circuit 60 comprises a comparator 61 having two input voltage terminals 62, 63. Input voltage terminal 62 is coupled to one plate of a storage capacitor 64 and monitors the value of the supply voltage from power supply 35 by means of a first voltage divider circuit consisting of resistors 65, 66. Input voltage terminal 63 is coupled to the output of a voltage regulator 68, from which the operating voltage for control unit 20 and the remaining vehicle detector system electronic elements is obtained. Input voltage terminal 63 monitors the value of the voltage output from regulator 68 by means of a second voltage divider circuit consisting of resistors 70, 71. Whenever the supply voltage from power supply 35 begins to drop, the voltage on input terminal 62 follows this trend immediately, while the voltage on input terminal 63 only follows this trend with a time delay. By comparing the two voltage values, an impending power outage is sensed by comparator 61. Whenever the difference between the two voltages indicates that the supply voltage on capacitor 64 has dropped below the fixed threshold, the level of the signal on control output terminal 67 of comparator 61 changes to signal control unit 20 to begin the power down impending routine. In a specific embodiment of the invention using the microprocessor noted above with a nominal operating voltage of 5.0 D.C. volts and a minimum operating voltage of 4.75 D.C. volts, a 12.0 D.C. volts power supply, and a regulated supply voltage of 5.0 D.C. volts, the fixed threshold is 7.1 D.C. volts. Other threshold values may be selected, as appropriate.

When control unit 20 receives the control signal from comparator 61 signifying an impending power outage, control unit 20 transfers certain information stored in reference memory 28 to non-volatile memory device 50. The reference information transferred to non-volatile memory device 50 comprises two basic types: a reference count and the number of loop cycles over which the reference count was accumulated. The value of the reference count is the most recent value stored in reference memory 28. The value of the number of loop cycles over which the reference count was accumulated is a number calculated during the initialization of the vehicle detector and stored in reference memory 28 and non-volatile memory device 50.

In addition to the two essential types of information noted above, other useful reference information may be transferred to non-volatile memory device 50 during the power down impending routine. For example, a status bit can be set to in a dedicated register location in non-volatile memory device 50 to signify that a power down failure occurred. Further, if the vehicle detector is in a Call state of operation—i.e., in the process of issuing a Call signal—this status information can be stored in non-volatile memory device 50. Additionally, if the vehicle detector had experienced a current or previous failure—such as a loop failure—this status information can be stored in non-volatile memory device 50. Also, the status of a given reference tracking routine being performed at the time can also be stored in non-volatile memory device 50, along with any reference value used in the performance of the tracking routine. In general, any useful status information can be saved for subsequent use when power is restored.

After power is restored to the vehicle detector, control unit 20 begins operation by checking the value of the power down failure bit in the register of non-volatile memory device 50. If the value of this bit indicates that a power down failure occurred previously, any pertinent previously stored information is transferred to reference memory 28. In this way, the vehicle detector can restart operation with a valid reference count, the number of loop cycles over which the reference count was accumulated, and optionally, correct status information as of the time when power was previously lost. Thus, if a vehicle was over the loop when power was lost and is still present when power is restored, it will be detected. Similarly, if no vehicle was over the loop when power was lost and no vehicle is occupying the loop when power is restored, the vehicle detector will detect this condition. Further, if a vehicle was over the loop when power was lost and left during the power outage, the vehicle detector will detect this change. Also, if no vehicle was over the loop when power was lost and a vehicle is occupying the loop when power is restored, the vehicle detector will detect this condition. In addition, depending on the type of status information previously stored in non-volatile memory device 50, the vehicle detector will recapture the Call state, reference tracking state, loop failure history, and any other status information of interest.

Figure 3:
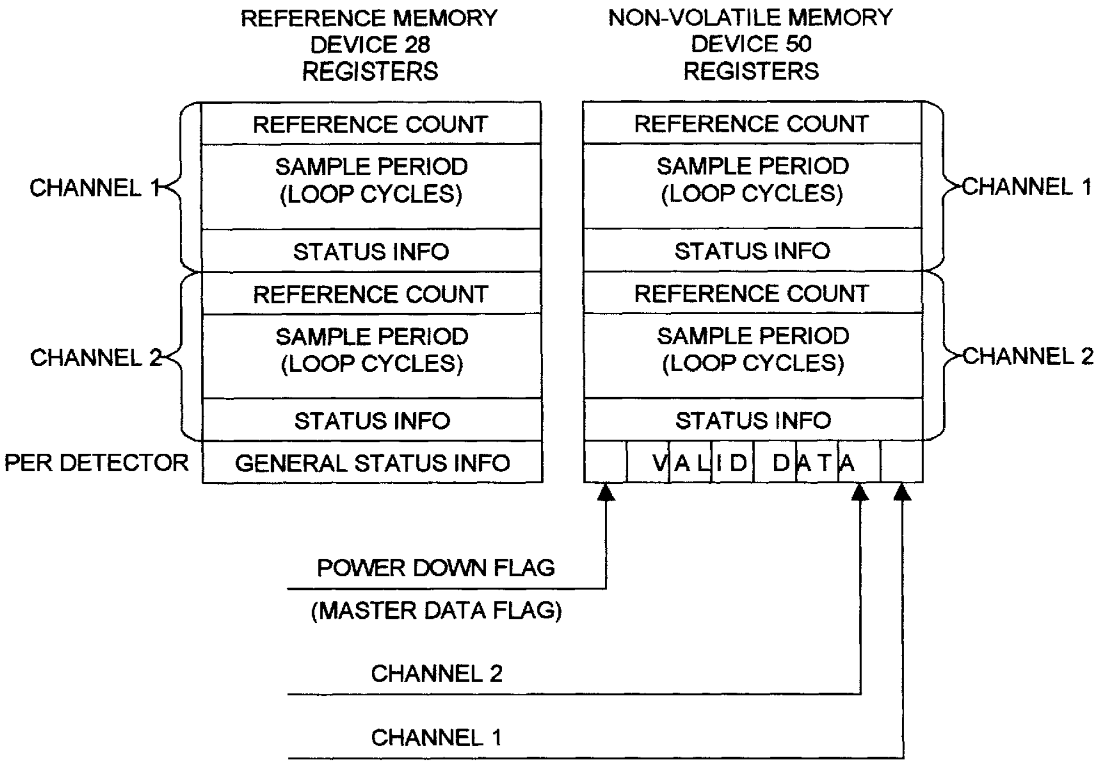
FIG. 3 is a schematic diagram illustrating some of the registers in the vehicle detector volatile memory and the non-volatile memory device.

The vehicle detector illustrated in FIG. 1 is a single channel detector having one transformer 13 and associated loop. Vehicle detectors are known which incorporate two or more channels, i.e. two or more transformers 13 and associated loops. In such multiple channel detectors, the status information stored in non-volatile memory device includes channel information which associates the reference count, sample period, and status information to the proper channel. FIG. 3 illustrates a preferred technique for implementing data-to-channel association in a two channel vehicle detector. As seen in this Fig., reference memory 28 and non-volatile memory device 50 each have registers allocated to the reference count, the sample period value (preferably comprising the number of loop cycles over which the reference count was accumulated), and status information for each channel. In addition, non-volatile memory device 50 has a valid data register for storing status information regarding individual channel data and also a status register for the whole detector. In the two channel example illustrated, the valid data register has dedicated bit positions for channel one and channel two, as well as a power down bit position for indicating whether there is valid data regarding power down stored in non-volatile memory device 50. The purpose of the power down bit is to eliminate unnecessary reading, erasing and re-writing of the non-volatile memory device 50 when there is no data to be restored, thereby extending the useful life cycle of the non-volatile memory device. The purpose of the dedicated channel bit positions is similar: the value of channel bit indicates whether there is valid data stored in the registers associated to that bit channel. If not, then these associated registers are not examined. It is noted that this function of reading data only when valid data is present is also applicable to a single channel implementation of the invention to avoid unnecessary operation of the non-volatile memory device 50.

In operation, when power is restored to the vehicle detector control unit 20 accesses the valid data register of non-volatile memory device 50 and inspects the power down bit and the channel bits. If the value of the power down bit indicates that no valid data is stored in device 50, the data restore operation is by-passed. If the value of the power down bit indicates that valid data is stored in non-volatile memory device 50, then control unit 20 accesses and transfers to reference memory 28 the data from those registers with valid data as specified by the channel bits. If a channel bit indicates that no valid data is present for that channel, the associated registers are not accessed.

It should be noted that transfer of the reference information from the non-volatile memory device 50 to the vehicle detector upon application of power to the vehicle detector is not always appropriate. For example, when a new vehicle detector is initially powered up, there is no historical reference information stored in non-volatile memory device 50 to be transferred. Either the power down status bit or the valid data bits (or both) ensure that no transfer will take place under this circumstance. Similarly, when an already installed vehicle detector is disconnected by physically removing it from the associated connector slot and then reconnecting it in the same or a different slot, the data restore operation would normally not be useful or appropriate. However, under this circumstance the value of the power down bit, and probably one or more of the valid data bits, would indicate the need to perform the transfer operation. To prevent this undesired operation, the power down impending routine includes an initial loop check to determine whether the impending power loss is due to a mechanical power disconnect between the vehicle detector and the loop. If not, the power down impending routine proceeds normally as described above. If so, the power down impending routine is aborted.

The initial loop check may be performed in a variety of ways. In the preferred embodiment, the initial loop check is done by sensing whether the loop is present in the vehicle detector circuit. If not, the impending power down condition is assumed to be due to a physical disconnect between the vehicle detector and the loop, and the impending power down routine is aborted. Alternatively, the initial loop check may be performed by installing a continuity switch between the vehicle detector connectors and the detector connector socket, and sensing the state of this switch. The continuity switch may assume many different forms, such as a shortened connector pin for one of the two main power connectors, so that this pin will disconnect before the remaining conductor pins when the vehicle detector is physically removed from the detector socket.

As will now be apparent to those skilled in the art, vehicle detectors provided with the invention reliably eliminate the uncertainties and potentially dangerous conditions encountered in the past when power has been lost and subsequently restored to a vehicle detector operating in the field. In particular, with the invention a vehicle cannot be “lost” in the interim between power loss and power resumption: if a vehicle was present when the power loss occurred and is still present in the loop when power resumes, it will be detected. If a vehicle was present and has departed from the loop during the power-down interim, this condition will also be detected by the normal Call routine. If a vehicle was not present in the loop, but one has entered the loop during the power-down interim, this condition will also be detected by the normal Call routine. If no vehicle was present in the loop, and none entered during the power-down interim, this condition will be detected by the normal Call routine. These advantages are accomplished at relatively low cost by using a non-volatile memory device to store the needed reference information only when there exists an impending power down condition—thereby substantially reducing the frequency of use of the erase-write cycle in the non-volatile memory device, which substantially prolongs the useful life time of such a device.

Although the invention has been described with reference to the loss of power to the cabinet housing the vehicle detector and other traffic control equipment, the invention also provides protection in the event that only the vehicle detector loses power, while the reminder of the traffic control equipment remains powered up. Such a condition has occurred in the past in installations having one or more vehicle detectors provided with individual power supplies with only marginal capacity. In such installations, a drop in the externally-supplied line voltage can cause the vehicle detector power supply output voltage to drop below the threshold operating voltage required for the vehicle detector to function properly. When the line voltage recovers, the vehicle detector resumes operating with the preserved reference information as described above.

Although the above provides a full and complete disclosure of the preferred embodiments of the invention, various modifications, alternate constructions and equivalents will occur to those skilled in the art. Therefore, the above should not be construed as limiting the invention, which is defined by the appended claims.

What is claimed is:

1. In a vehicle detector having circuitry powered by a source of electrical power for sensing changes in an associated inductive loop related to the presence of a vehicle in the vicinity of the loop and for generating a Call signal in response to such changes; the improvement comprising a non-volatile memory device for receiving and storing reference information from the vehicle detector, a power monitor circuit for detecting an impending loss of power to the vehicle detector, and means responsive to said power monitor circuit for storing said reference information in said non-volatile memory device upon detection of an impending loss of power.

2. The invention of claim 1 wherein said reference information includes a loop inductance reference count accumulated over a sample period and a sample period value.

3. The invention of claim 2 wherein said sample period value comprises the number of loop cycles over which the loop inductance reference count was accumulated.

4. The invention of claim 1 wherein said reference information includes status information relating to the detector prior to loss of power.

5. The invention of claim 4 wherein said status information includes an indication whether the vehicle detector is generating a Call signal when the impending loss of power is detected by the power monitor circuit.

6. The invention of claim 1 wherein said reference information includes status information specifying whether valid data is presently stored in said non-volatile memory device.

7. The invention of claim 1 wherein said vehicle detector is a multi-channel detector; and wherein said reference information includes a plurality of channel identifiers each associated to a different one of the channels for identifying the reference information for the channel associated thereto.

8. The invention of claim 1 further including means for enabling transfer of said reference information to said vehicle detector when power is resumed after a loss.

9. The invention of claim 8 further including means for sensing an impending loss of power due to a mechanical interruption of power to the vehicle detector, and means for preventing operation of said means for enabling transfer in response to the operation of said sensing means.

10. The invention of claim 9 wherein said sensing means includes means for determining the absence of a connection between the loop and the vehicle detector.

11. A method of saving reference information in a vehicle detector volatile memory prior to an impending power loss, said method comprising the steps of:

(a) sensing an impending loss of power to the vehicle detector; and (b) storing the reference information in a non-volatile memory device before the vehicle detector becomes inoperative due to a loss of power.

12. The method of claim 11 wherein said step (b) of storing includes the step of storing a loop inductance reference count accumulated over a sample period and a sample period value.

13. The method of claim 11 wherein said sample period value comprises the number of loop cycles over which the loop inductance reference count was accumulated.

14. The method of claim 11 wherein said reference information includes status information relating to the detector prior to loss of power.

15. The method of claim 14 wherein said status information includes an indication whether the vehicle detector is generating a Call signal when the impending loss of power is sensed.

16. The method of claim 11 wherein said reference information includes status information specifying whether valid data is stored in said non-volatile memory device.

17. The method of claim 11 wherein said vehicle detector is a multi-channel detector; and wherein said reference information includes a plurality of channel identifiers each associated to a different one of the channels for identifying the reference information for the channel associated thereto.

18. The method of claim 11 further including the step of enabling transfer of said reference information to said vehicle detector when power is resumed after a loss.

19. The method of claim 11 further including the steps of sensing an impending loss of power due to a mechanical interruption of power to the vehicle detector, and preventing performance of said step (b) of storing when an impending loss of power due to a mechanical interruption is sensed.

20. The method of claim 11 wherein said step of sensing an impending loss of power due to a mechanical interruption includes the step of determining the absence of a connection between the loop and the vehicle detector.

* * * * *